United States Patent Office 2,999,982
Patented Sept. 12, 1961

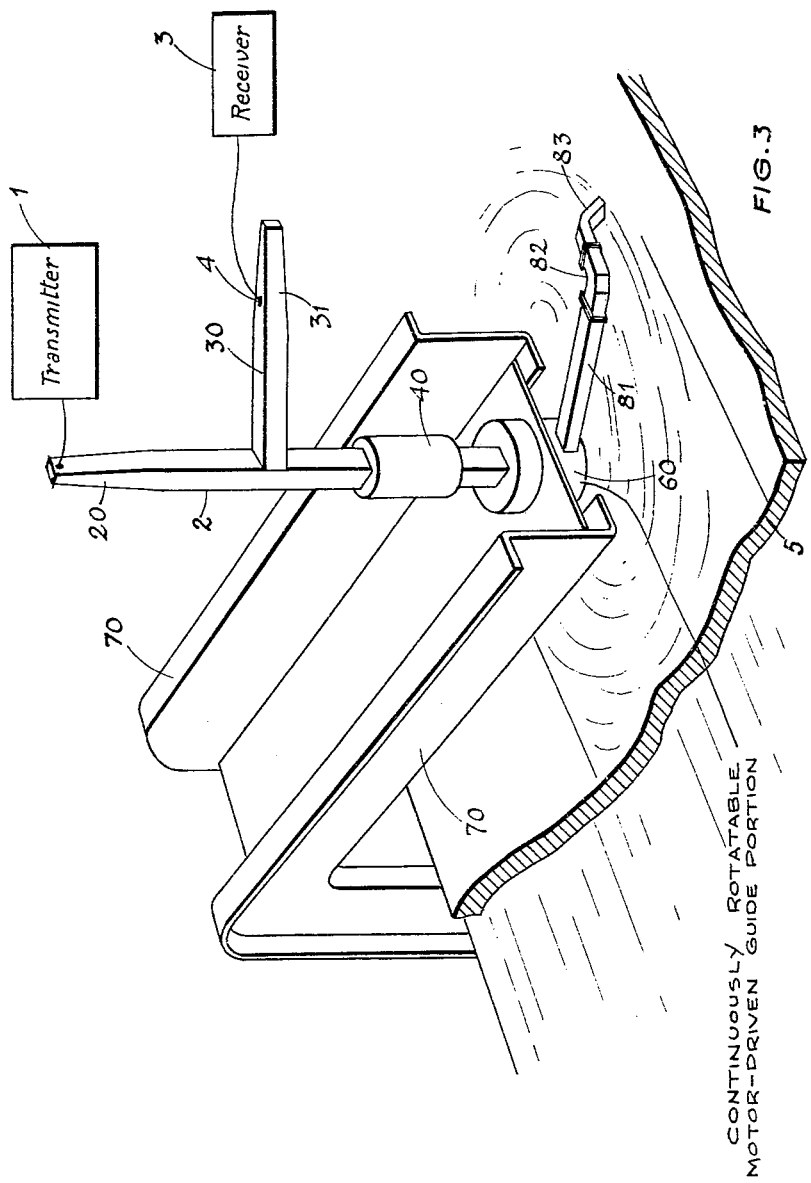

2,999,982
ELECTROMAGNETIC DEVICE FOR HOMOGENEITY CONTROL
Georges Broussaud, Paris, France, assignor to Compagnie Generale de Telegraphie Sans Fil, a corporation of France
Filed Jan. 6, 1958, Ser. No. 707,391
Claims priority, application France Jan. 25, 1957
6 Claims. (Cl. 324—58.5)

The present invention relates to devices and methods for detecting homogeneity defects in compact materials, such as polished glass.

It is usual for polished glass to emerge in the shape of long strips or bands at the delivery end of a rolling mill. Particular care must be exercised by a specialized staff for meticulously checking and scrutinizing the whole surface of the glass for possible homogeneity defects which may be critical in so far as the cutting and the sorting of the glass, in view of the subsequent use thereof, is concerned. This checking operation requires much time and can lower the production rate.

It is an object of the present invention to provide an automatic device capable of detecting and locating homogeneity defects in strips or plates of glass or other analogous material.

The invention will be best understood from the following description of an embodiment thereof taken in connection with the accompanying drawings, in which:

FIG. 3 shows the device of FIG. 1 in greater detail.

Figure 1:
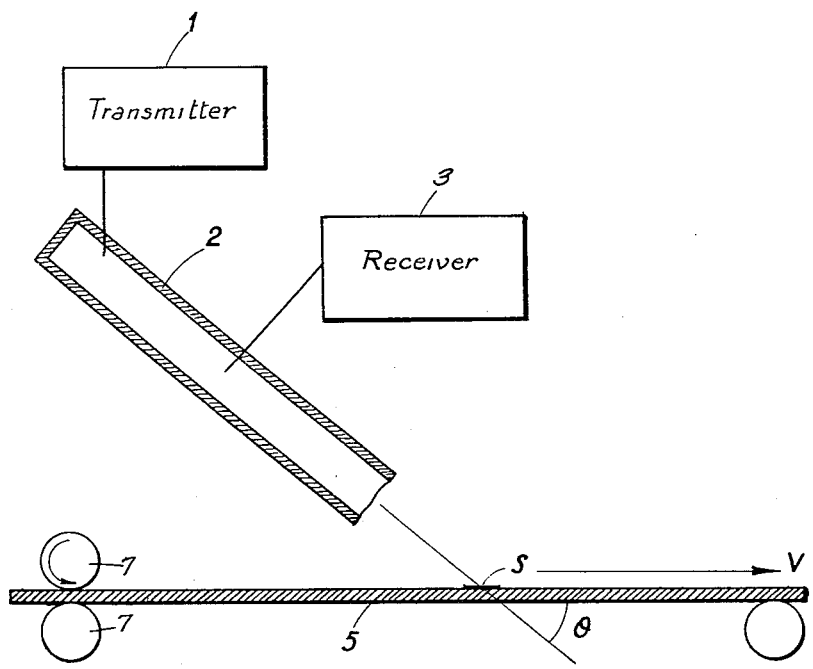
FIG. 1 is a very diagrammatic view, partly in section, of a device according to the invention.

Referring to FIG. 1, a transmitter 1 such as, for example, a klystron operating at a very high frequency, which may be a frequency corresponding to a wavelength of the order of a few millimeters, feeds a wave-guide 2 closed at one end and open at the other. A receiver 3 is coupled to guide 2 at a central portion thereof. A glass ribbon 5, which is to be checked for any possible lack of homogeneity, is advanced at a constant speed V by supporting rollers 7 or other suitable mechanism past the mouth of guide 2 and in close proximity thereto. The operation of the device is as follows:

Guide 2 illuminates an area $s$ of the glass plate, the size of this area being substantially equal to the cross section of guide 2. If the glass is homogenous, its movement does not interfere with the propagation of the wave energy and a constant portion of this energy is reflected at the same frequency and gives rise to stationary waves in the guide.

If, however, any heterogeneity passes the mouth of the guide 2, diffraction occurs and the diffracted energy is affected by the Doppler effect i.e. its frequency $f$ is changed to $f'$, with $$f' = f + 2f \cdot \frac{V}{c} \cos \theta \qquad (1)$$

wherein $\theta$ is the angle of the axis of guide 2 with the surface of the glass, i.e. the angle between the direction of energy propagation and the direction of the glass, and $c$ is the velocity of light.

Receiver 3 provides an output wave of frequency $$F = f' - f = 2f \frac{V}{c} \cos \theta$$

resulting from the heterodyning of the reflected and of the diffracted energy. Its amplitude is a function of the size of the homogeneity defect appearing in the glass and which is thus detected.

Such defects are usually of the order of .10 cm., i.e. of the order of .10λ.

It can be shown that the diffracted energy collected by guide 2, with the dimension of surface $s$ being of the order of λ, is about 100 dbs. below the level of the radiated energy which may be of the order of 10 to 100 milliwatts, which is more than is usually the case in radar detecting systems.

Receiver 3 should advantageously be given a low passband, for instance not much higher than the frequency F due to the Doppler effect, and which for technological reasons should not fall below 600 c./s.

This calls for a comparatively high speed in so far as the glass is concerned. With a transmission frequency wave of $f = 10^5$ mc./s., this speed must be 6.50 m./s., i.e. distinctly higher than the permissible one. To avoid any speed which might involve a risk of breaking the glass, the illuminated surface portion $s$ is submitted to a movement of rapid relative rotation with respect to guide 2 in addition to the relatively slow translation movement of the glass.

Figure 2:
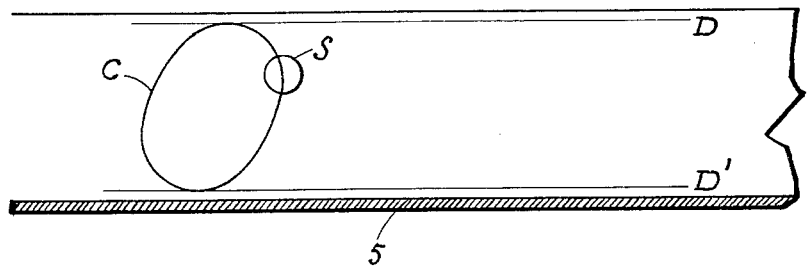
FIG. 2 is an explanatory illustration of the operation of the device shown in FIG. 1.

In order that the whole of the surface bounded by two parallel lines D and D' be effectively scanned as shown in FIG. 2, it will suffice that glass band 5 should not progress by a length greater than the dimension of surface $s$, i.e. for example by a few millimeters during one revolution. If the diameter of circle C described by surface $s$ is 50 cms., a tangential speed of 650 cm./s. corresponds to a rotating speed of 260 revolutions per minute. For λ=5 mm., the speed of glass 5 is thus limited to 1.2 cm./s.

FIG. 3 illustrates, in greater detail, an embodiment of the invention. The same reference numerals have been used to designate the same elements as in FIG. 1.

Guide 2 has a square cross section but its end 20 is flattened to a rectangular cross section. End 20 is coupled to transmitter 1. Another square guide 30 is coupled to guide 2. It is also terminated by a rectangular end 31, the long side of which is parallel to the axis of guide 2, i.e. is perpendicular to the long side of the end portion 20 of guide 2. Thus, no energy from transmitter 1 reaches receiver 3 which is coupled to guide 30.

Intermediate its coupling with guide 30 and its lower end, guide 2 supports a winding 40 and a ferrite gyrator is located along the axis of this winding. The ferrite rod is provided to cause the direction of polarization of the rectilinearly polarized waves which are propagating in guide 2 to rotate by 45°.

Guide 2 is coupled with a rotary joint 60, the stationary portion of which is supported by two arms 70. The mobile portion of the rotary joint is continuously rotated by a high speed motor (not shown) while maintaining the mouthpiece or terminal portion 83 of guide arm 81 at an essentially constant distance from the strip 5.

Joint 60 is rigidly connected to a guide 81 which is coupled therewith. Guide 81 is terminated by a bent portion 82 and a mouthpiece 83 making on angle $\theta$ with the horizontal.

The device operates as follows: transmitter 1 sends rectilinearly polarized waves into wave guide 2. The rotational device, comprising coil 40 and the ferrite, causes the polarization of these waves to rotate by 45°. Upon traversing joint 60 and guide 81, 82 and 83, the energy is reflected by glass band 5, with or without the Doppler effect as the case may be. The polarization direction of the reflected and diffracted waves is again rotated by 45° so that these waves reach receiver 3 but do not reach transmitter 1.

The beat between frequencies $f$ and $f'$ of the waves respectively reflected and diffracted by glass 5 is detected by receiver 3, which provides a means of detecting and locating any homogeneity defect present in glass 5.

Of course the invention is not limited to the embodiment shown which serves only as an example.

What I claim is:

1. A device for automatically detecting homogeneity defects in a body of compact material, said device comprising: an ultra high frequency energy generator; a wave guide coupled to said generator and having an open end; means for supporting said body adjacent said guide opposite said open end for directing the energy from said guide upon a surface of said body at an acute angle with respect thereto; means for effecting relative movement between said open end and said body in a direction generally parallel to said surface to scan said surface while maintaining the distance therebetween essentially constant; and a receiver means coupled to said guide for collecting the ultra high frequency energy reflected and the ultra high frequency energy diffracted by said body, said receiver means heterodyning said signals and detecting the beat frequency for indicating defects in the body.

2. A device for automatically detecting homogeneity defects in a strip of compact material moving at a uniform speed, said device comprising: an ultra high frequency energy generator; a wave guide coupled to said generator, having an open end; means for supporting said strips to move past said end and in the vicinity thereof and in position with energy from said open end being directed thereat at an acute angle; means for effecting relative movement between said open end and said strip to scan the surface of the latter while maintaining the distance therebetween essentially constant; a receiver coupled to said guide; and switching means between said generator, said receiver and said open end for switching said ultra high frequency energy to said open end and for switching the ultra high frequency energy portion reflected by said strip and the ultra high frequency energy portion diffracted by defects in the homogeneity of said strip to said receiver, said receiver comprising means for heterodyning said energy portions and detecting the beat thereof.

3. A device for automatically detecting homogeneity defects in a strip of compact material moving at a predetermined speed, said device comprising: an ultra high frequency generator; a first wave guide having two ends, said generator being coupled to said first guide near said one end for propagating therein ultra high frequency energy rectilinearly polarized in a first direction, said end being tapered for allowing propagation only of energy polarized in said direction; a ferrite gyrator in said first guide for rotating said polarization direction by an angle equal to $$\frac{\pi}{4}$$

said other end of said first guide being means for effecting relative movement between said strip and the other end of said first guide with a constant distance therebetween; means positioning said other end to direct energy therefrom at an acute angle with respect to the surface of said strip and to collect energy portions reflected and diffracted by said strip; a second wave guide opening into said first wave guide, intermediate said gyrator and said first end, said second wave guide having an end portion tapered for allowing propagation only of wave energy having a polarization direction perpendicular to said first polarization direction; and a receiver coupled to said end for receiving said reflected and diffracted energy portions, said receiver comprising means for heterodyning said energy portions and detecting the beat therebetween.

4. A device for automatically detecting homogeneity defects in a strip of compact material moving at a predetermined speed, said device comprising: an ultra high frequency generator; a first wave guide having two ends, said generator being coupled to said first guide near one end for propagating therein ultra high frequency energy rectilinearly polarized in a first direction, said one end being tapered for allowing propagation only of energy polarized in said direction; a ferrite gyrator in said first guide for rotating said polarization direction by an angle equal to $$\frac{\pi}{4}$$

means for effecting relative movement between said strip and the other end of said first guide with a constant distance therebetween; means positioning said other end to direct energy therefrom at an acute angle with respect to the surface of said strip and to collect energy portions reflected and diffracted by said strip; a second wave guide opening into said first wave guide, intermediate said gyrator and said one end, said second wave guide having an end portion tapered for allowing propagation only of wave energy having a polarization direction perpendicular to said first polarization direction; a receiver coupled to said end for receiving said reflected and diffracted energy portions, said receiver comprising means for heterodyning said energy portions and detecting the beat therebetween; and means for displacing the portion of said strip subjected to the energy flowing from said second end of said first guide along a predetermined closed line.

5. A device for automatically detecting homogeneity defects in a strip of compact material moving at a predetermined speed, said device comprising: an ultra high frequency generator; a first wave guide having two ends, said generator being coupled to said first guide through one of said ends for propagating therein ultra high frequency energy rectilinearly polarized in a first direction, said end being tapered for allowing propagation only of energy polarized in said direction; a ferrite gyrator in said first guide for rotating said polarization direction by an angle equal to $$\frac{\pi}{4}$$

a rotary joint means having a fixed portion coupled to the other end of said first guide and a continuously rotatable motor-driven portion having an arm, said arm having a terminal portion for directing energy from said arm upon said strip at an acute angle with respect thereto and for collecting energy portions reflected and diffracted by said strip; said rotary joint means providing scanning of said strip by said arm on said rotatable portion while maintaining the distance between said terminal portion and said strip essentially constant a second wave guide opening into said first wave guide intermediate said gyrator and said one end, said second wave guide having an end portion tapered for allowing propagation only of wave energy having a polarization direction perpendicular to said first polarization direction; and a receiver coupled to said end portion for receiving said reflected and diffracted energy, said receiver comprising means for heterodyning said energy portions and detecting the beat therebetween.

6. A device for automatically detecting homogeneity defects in a body of compact material, said device comprising: an ultra high frequency generator of microwave energy, energy guiding means operatively connected to said generator for transmitting said microwave energy at an acute angle upon a limited surface portion of said body; means for supporting said body adjacent to said energy guiding means; means for effecting relative movement between said energy guiding means and said body while maintaining the distance therebetween generally constant; and receiver means including means for collecting part of said ultra high frequency energy returned from said limited surface portion toward said guiding means; said energy guiding means being so oriented with respect to the body supporting means and the means for effecting relative movement between said guiding means and said body to produce at said collecting means ultra high frequency energy of one frequency reflected by said body and ultra high frequency energy of a different frequency resulting from energy diffraction by said body due to defects therein at said limited surface portion, said receiver means heterodyning the reflected energy of said one frequency and the diffracted energy of said different frequency to provide indication of such defects in the body.

References Cited in the file of this patent

UNITED STATES PATENTS

| | | |
|---|---|---|
| 2,467,455 | Aurell | Apr. 19, 1949 |
| 2,622,127 | Alsberg et al. | Dec. 16, 1952 |
| 2,645,769 | Roberts | July 14, 1953 |
| 2,746,014 | Fox | May 15, 1956 |
| 2,767,379 | Mumford | Oct. 16, 1956 |
| 2,768,354 | Hogan | Oct. 23, 1956 |
| 2,808,584 | Kock | Oct. 1, 1957 |

OTHER REFERENCES

Ryan et al.: "Microwaves Used To Observe Commutator and Slip Ring Surfaces During Operation," Electrical Engineering, March 1954; pages 251–255.